United States Patent
Olivier et al.

(10) Patent No.: US 8,761,071 B2
(45) Date of Patent: **\*Jun. 24, 2014**

(54) INTERNET PROTOCOL RADIO DISPATCH SYSTEM AND METHOD

(75) Inventors: Pierre Olivier, Gatineau (CA); Douglas Gordon Roberts, Richmond (CA)

(73) Assignee: Cassidian Communications, Inc., Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,087

(22) Filed: Jun. 4, 2012

(65) Prior Publication Data

US 2013/0114493 A1    May 9, 2013

Related U.S. Application Data

(63) Continuation of application No. 12/340,385, filed on Dec. 19, 2008, now Pat. No. 8,194,647, which is a continuation of application No. 11/096,081, filed on Apr. 1, 2005, now Pat. No. 7,483,416.

(51) Int. Cl.
*H04H 20/71* (2008.01)

(52) U.S. Cl.
USPC ........... 370/312; 370/356; 370/389; 370/392; 370/401; 379/37; 379/45

(58) Field of Classification Search
USPC ......... 370/312, 325–356, 389, 392, 400, 401; 379/37, 45
See application file for complete search history.

(56) References Cited

U.S. PATENT DOCUMENTS

| | | | |
|---|---|---|---|
| 3,881,060 A | 4/1975 | Connell et al. | |
| 4,029,901 A | 6/1977 | Campbell | |
| 4,677,656 A | 6/1987 | Burke et al. | |
| 4,893,325 A | 1/1990 | Pankonen et al. | |
| 5,206,903 A | 4/1993 | Kohler et al. | |
| 5,239,570 A | 8/1993 | Koster et al. | |
| 5,311,569 A | 5/1994 | Brozovich et al. | |
| 5,384,841 A * | 1/1995 | Adams et al. | 379/266.04 |
| 5,392,277 A | 2/1995 | Bernstein | |
| 5,479,482 A | 12/1995 | Grimes | |

(Continued)

FOREIGN PATENT DOCUMENTS

| | | |
|---|---|---|
| CA | 2306638 | 11/2000 |
| EP | 1 054 554 | 11/2000 |

(Continued)

OTHER PUBLICATIONS

U.S. Appl. No. 60/264,242, filed Jun. 1, 2004, Ryan et al.

(Continued)

*Primary Examiner* — Andrew Lai
*Assistant Examiner* — Andrew C Lee
(74) *Attorney, Agent, or Firm* — Knobbe Martens Olson & Bear LLP

(57) ABSTRACT

A method and system for dispatching calls using a packet network is disclosed. The use of distributed call management modules, enables various communication systems, such as RF and PSTN systems, to communicate with each other over the IP network. Audio devices from the various communication systems are each assigned an IP multicast group. Distributed call management modules covert signals from the audio devices into IP packets and transmit the IP packets to designated IP multicast groups over the IP network.

29 Claims, 10 Drawing Sheets

(56) References Cited

U.S. PATENT DOCUMENTS

| | | | |
|---|---|---|---|
| 5,481,545 | A | 1/1996 | Maedjaja et al. |
| 5,696,809 | A | 12/1997 | Voit |
| 5,841,848 | A | 11/1998 | Dunn |
| 5,844,974 | A | 12/1998 | Ichikawa |
| 5,862,485 | A | 1/1999 | Linneweh, Jr. et al. |
| 5,867,562 | A | 2/1999 | Scherer |
| 5,898,757 | A | 4/1999 | Buhler et al. |
| 5,905,792 | A | 5/1999 | Miloslavsky |
| 5,915,010 | A | 6/1999 | McCalmont |
| 5,937,051 | A | 8/1999 | Hurd et al. |
| 5,937,334 | A | 8/1999 | Peterson et al. |
| 5,937,355 | A | 8/1999 | Joong et al. |
| 5,940,497 | A | 8/1999 | Miloslavsky |
| 5,970,065 | A | 10/1999 | Miloslavsky |
| 5,999,965 | A | 12/1999 | Kelly |
| 6,009,163 | A | 12/1999 | Nabkel et al. |
| 6,067,356 | A | 5/2000 | Lautenschlager et al. |
| 6,075,853 | A | 6/2000 | Boeckman et al. |
| 6,128,481 | A | 10/2000 | Houde et al. |
| 6,175,562 | B1 | 1/2001 | Cave |
| 6,175,563 | B1 | 1/2001 | Miloslavsky |
| 6,175,564 | B1 | 1/2001 | Miloslavsky |
| 6,185,205 | B1 | 2/2001 | Sharrit et al. |
| 6,185,287 | B1 | 2/2001 | Miloslavsky |
| 6,198,920 | B1 | 3/2001 | Doviak et al. |
| 6,233,445 | B1 | 5/2001 | Boltz et al. |
| 6,252,943 | B1 | 6/2001 | Johnson et al. |
| 6,256,489 | B1 | 7/2001 | Lichter et al. |
| 6,289,083 | B1 | 9/2001 | Ray |
| 6,292,542 | B1 | 9/2001 | Bilder |
| 6,324,279 | B1 | 11/2001 | Kalmanek et al. |
| 6,327,342 | B1 | 12/2001 | Mobley et al. |
| 6,330,324 | B1 | 12/2001 | Sabinson et al. |
| 6,332,022 | B1 | 12/2001 | Martinez |
| 6,392,999 | B1 | 5/2002 | Liu et al. |
| 6,453,038 | B1 | 9/2002 | McFarlene et al. |
| 6,546,087 | B2* | 4/2003 | Shaffer et al. ............... 379/90.01 |
| 6,563,919 | B1 | 5/2003 | Aravamudhan et al. |
| 6,587,545 | B1 | 7/2003 | Antonucci et al. |
| 6,654,455 | B1 | 11/2003 | Isaka |
| 6,697,475 | B1* | 2/2004 | MeLampy et al. ........ 379/201.12 |
| 6,744,858 | B1 | 6/2004 | Ryan et al. |
| 6,744,859 | B1 | 6/2004 | Koepke et al. |
| 6,771,742 | B2 | 8/2004 | McCalmont et al. |
| 6,888,803 | B1 | 5/2005 | Gentry et al. |
| 6,910,074 | B1* | 6/2005 | Amin et al. ..................... 709/227 |
| 6,912,278 | B1* | 6/2005 | Hamilton ................. 379/221.14 |
| 6,944,166 | B1* | 9/2005 | Perinpanathan et al. ...... 370/401 |
| 6,963,557 | B2 | 11/2005 | Knox |
| 6,977,899 | B1* | 12/2005 | Matragi et al. ................. 370/237 |
| 6,993,118 | B2 | 1/2006 | Antonucci et al. |
| 7,080,157 | B2 | 7/2006 | McCanne |
| 7,099,451 | B1* | 8/2006 | Jordan et al. ............. 379/212.01 |
| 7,830,860 | B2* | 11/2010 | Farris et al. .................... 370/352 |
| 7,899,167 | B1* | 3/2011 | Rae .................................. 379/189 |
| 8,024,401 | B1* | 9/2011 | Gurbani et al. ................ 709/204 |
| 2001/0040887 | A1 | 11/2001 | Shtivelman et al. |
| 2001/0043586 | A1 | 11/2001 | Miloslavsky |
| 2002/0001300 | A1 | 1/2002 | Miloslavsky et al. |
| 2002/0068584 | A1* | 6/2002 | Gage et al. ..................... 455/456 |
| 2002/0110104 | A1 | 8/2002 | Sudila et al. |
| 2002/0176404 | A1* | 11/2002 | Girard ............................ 370/352 |
| 2002/0194474 | A1* | 12/2002 | Natsuno et al. ................ 713/168 |
| 2002/0197977 | A1 | 12/2002 | Brooks |
| 2003/0007469 | A1 | 1/2003 | Daley et al. |
| 2003/0012149 | A1* | 1/2003 | Maggenti et al. ............. 370/260 |
| 2003/0053434 | A1 | 3/2003 | Chow et al. |
| 2003/0058827 | A1 | 3/2003 | Chow et al. |
| 2003/0139174 | A1 | 7/2003 | Rao |
| 2003/0179772 | A1 | 9/2003 | Niklasson et al. |
| 2004/0053607 | A1 | 3/2004 | Ronneke |
| 2004/0105529 | A1 | 6/2004 | Salvucci et al. |
| 2004/0125775 | A1* | 7/2004 | Rios ............................... 370/338 |
| 2004/0184584 | A1 | 9/2004 | McCalmont et al. |
| 2004/0190468 | A1 | 9/2004 | Saijonmaa |
| 2004/0228469 | A1* | 11/2004 | Andrews et al. ......... 379/265.03 |
| 2005/0030966 | A1 | 2/2005 | Cai et al. |
| 2005/0084088 | A1* | 4/2005 | Hamilton ................. 379/207.02 |
| 2005/0090225 | A1 | 4/2005 | Muehleisen et al. |
| 2005/0154792 | A1* | 7/2005 | Deryugin et al. ............. 709/224 |
| 2005/0201358 | A1 | 9/2005 | Nelson et al. |
| 2005/0201359 | A1 | 9/2005 | Nelson et al. |
| 2005/0201527 | A1 | 9/2005 | Meer et al. |
| 2005/0201528 | A1 | 9/2005 | Meer et al. |
| 2005/0201529 | A1 | 9/2005 | Nelson et al. |
| 2006/0002540 | A1* | 1/2006 | Kreiner et al. ............ 379/265.02 |

FOREIGN PATENT DOCUMENTS

| | | |
|---|---|---|
| EP | 1 109 417 | 6/2001 |
| EP | 1 453 248 | 9/2004 |
| WO | WO 01/65763 | 9/2001 |
| WO | WO 01/65868 A1 | 9/2001 |
| WO | WO 01/67733 | 9/2001 |
| WO | WO 2005/015804 | 2/2005 |

OTHER PUBLICATIONS

Cisco IP Telephony Network Design Guide. Cisco CallManager Release 3.0. Corporate Headquarters, Cicso Systems, Inc. San Jose, CA. Customer Order No. DOC-7811103; Text Part No. 78-11103-01, Year: 2001.
Deering, S.; Host Extensions for IP Multicasting; Aug. 1998; pp. 1-15. http://www.ietf.org/rfc/rfc1112.txt.
E9-1-1 Systems—Product Guide, Software Release B:2.1, CML Public Safety Systems, Jul. 1999.
Fenner, W.; Internet Group Management Protocol, Version 2; Nov. 1997; pp. 1-22. http://www.ietf.org/rfc/rfc2236.txt.
Final Rejection by Examiner dated Aug. 17, 2007 issued in U.S. Appl. No. 11/095,465, filed Apr. 1, 2005.
Final Rejection by Examiner dated May 9, 2008 issued in U.S. Appl. No. 11/095,465, filed Apr. 1, 2005.
http://www.vega-signaling.com/RadioDispatch/products.nsf/pages/Product-Type=Portable%20Interoperability.
http://www.zetron.com/pages/english/products/landmob2/html.
IP Products White Paper; Vega Telex Signalling Product Company; Aug. 9, 2002.
NENA Generic Standards for E9-1-1 PSAP Equipment. NENA Technical Reference. NENA-04-001 Issue I, Jun. 20, 1996. Prepared by: National Emergency Number Association (NENA) PSAP Standards Sub-Committee. Published by NENA. Printed in U.S.A.
NENA Recommended Generic Standards Dealing with Network Interface E9-1-1 and Emerging Technologies. NENA Technical Reference. NENA-03-XXX Draft Issue 1.01, Jul. 13, 2000. Generic Standards for E9-1-1 and Emerging Technologies. Prepared by: National Emergency Number Association (NENA) PSAP Standards Committee. Published by NENA. Printed in U.S.A.
NENA Recommended Generic Standards Dealing with Network Interface for E9-1-1 and Emerging Technologies, NENA PSAP Standards Committee, NENA-03-XXX, Draft Issue 1.06, Sep. 17, 2000.
NENA Recommended Generic Standards for E9-1-1 PSAP Equipment, NENA CPE/PSAP Standards Technical Committee, NENA-04-001, Issue 2, Mar. 2001.
NENA Standard, Generic Requirements for an Enhanced 9-1-1 Selective Routing Switch, NENA Network Technical Committee, NENA-03-005, Jan. 2004.
Network Access Radio; Catalyst Communications Technologies, Inc.:: Network Access Radio; pp. 1-3. http://www.catcomtec.com/index2.php?option=com_content&task-view&id=47&Itemid= . . . , Year: 2003.
Non-Final Rejection by Examiner dated Feb. 9, 2007 issued in U.S. Appl. No. 11/095,465, filed Apr. 1, 2005.
Non-Final Rejection by Examiner dated Nov. 30, 2007 issued in U.S. Appl. No. 11/095,465, filed Apr. 1, 2005.
$P25^{IP}$ Technical Overview; $P25^{IP}$. Secure and Reliable Digital Voice and Data Communications; Tyco/Electronics, Year: 2004.
Panossian et al.: Towards Providing Enhanced 911 Emergency Service in IP Telephony. Department of Computer Networking, University of Missouri-Kansas City. Nov. 1998. Revised: Aug. 1999.

(56) References Cited

OTHER PUBLICATIONS

Panossian, Serge G., "A Conceptual Architecture for Enhanced 911 Emergency Service for IP Telephony", Masters Thesis presented to the Faculty of the University of Missouri—Kansas City, Dec. 18, 1997.

Popovici, Edward C., et al., Consistency Support for a Decentralized Management in Close Multiparty Conferences Using SIP, The 11$^{th}$ IEEE International Conference on Sep. 28-Oct. 1, 2003, Piscataway, NJ, USA, IEEE. pp. 295-300.

Reed et al.: An Overview of the Challenges and Progress in Meeting the E-911 Requirement for Location Service. IEEE Communications Magazine, Apr. 1998. pp. 30-37.

Schulzrinne: Providing Emergency Call Services for SIP-based Internet Telephony. Internet Engineering Task Force. Columbia U., Internet Draft. Jul. 13, 2000. Expires: Dec. 2000.

Wave (Wide Area Voice Environment); Twisted Pair Solutions, Year: 2004.

\* cited by examiner

INTERNET PROTOCOL RADIO DISPATCH SYSTEM AND METHOD

RELATED APPLICATIONS

This application is a continuation application of U.S. application Ser. No. 12/340,385, filed Dec. 19, 2008 and issued on Jun. 5, 2012 as U.S. Pat. No. 8,194,647, which is a continuation of U.S. application Ser. No. 11/096,081, filed Apr. 1, 2005 and issued on Jan. 27, 2009 as U.S. Pat. No. 7,483,416.

FIELD OF THE INVENTION

This invention relates to radio dispatch systems and methods.

BACKGROUND OF THE INVENTION

Public safety communication systems, such as 911 services, police and firefighter systems, use radio dispatch. A constant in radio dispatch systems is the need to position radio sites, consisting of RF receivers and transceivers, according to geographic topography. However, the call takers are located elsewhere. For example, a 911 operator may be located at a PSAP (Public Service Answering Point). The radio sites are traditionally interconnected with a number of point to point leased lines creating a mesh of lines. The communication system is accessed by emergency personnel, such as police, firefighters and paramedics. Typically, dedicated public safety frequencies are used, which are frequently in the 800 MHz FM range. Nomadic call takers are not supported by these traditional systems.

In the aftermath of the event of Sep. 11, 2001, there is a mandate for there to be interoperability between the communication systems of the various emergency services agencies. Traditionally, each agency operates a private network, which is not programmed to access the frequencies of the other agencies. To make the traditional systems interoperable in a traditional manner, parallel lines are needed, as well as dedicated interoperable channels. The mesh of lines therefore gets more complicated.

Furthermore, each PSAP requires a backup. Using the traditional system, each backup requires its own set of leased lines, thus complicating the mesh of lines even further.

Packet based networks are presently used for VoIP (Voice Over Internet Protocol) communications. These VoIP communications traditionally have a central manager that runs the terminals.

SUMMARY OF THE INVENTION

Embodiments of the present invention provide a system and method for providing radio dispatch capability using, in one exemplary embodiment, an Internet Protocol (IP) network, operator workstations, radio gateways, telephone gateways, and distributed call management functions. In accordance with some embodiments of the present invention, intelligence of the system is distributed across the system, providing scalability, fault-tolerance, and the ability to distribute network elements, such as distributed call management modules (DCMM), geographically. Such geographic distribution allows optimization of the network in contrast to using dedicated lines to connect to the radio system. Multipoint-to-multipoint communication is preferably enabled. Networks embodying the present invention can provide the ability to remote operator positions over the public Internet through, for example, virtual private networks.

In one aspect, there is provided a dispatch control system operable to use a packet network, to provide audio and signaling connectivity to a plurality of audio devices, the system comprising: a plurality of distributed call management modules, each distributed call management module being adapted to serve a respective audio device and each distributed call management module having a respective group address for each audio device; each distributed call management module operable to convert audio and signaling from the respective audio device into packets for distribution through the packet network using the respective group address for receipt by any distributed call management modules monitoring the group address; and each distributed call management module operable to monitor at least one selected group address by: receiving packets addressed to at least one selected group address and converting such packets to audio and signaling for distribution to the audio device.

In a second aspect, there is provided a distributed call management module for use in a radio dispatch system, said distributed call management module comprising: an audio processing engine for converting an audio signal from an audio device to a packet signal; a call and management processing engine for directing the packet signal to a multicast group address; and a packet processor for encoding the packet signal as multicast packets and for decoding multicast packets from the packet network, said packet processor configured to send and receive packets over the packet network.

In a third aspect, there is provided a method of dispatching a call between audio devices, said audio devices being connected to a packet network, said method comprising: assigning multicast group addresses to each audio device; converting a call from a first audio device to packets; and transmitting the packets to the multicast group address of the first audio device.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which.

DESCRIPTION OF THE PREFERRED EMBODIMENTS

In the systems and methods that follow, distributed call management modules operate as distributed aggregation and control points for radio, telephone, operator entities and any audio device. By using the modules distributed call management is enabled, as opposed to traditional centralized call management. A plurality of distributed call management modules is deployed over a packet network forming a distributed dispatch control system. Calls from audio devices within the system are converted to a packet network protocol, assigned an address and directed to the assigned address.

Figure 1:
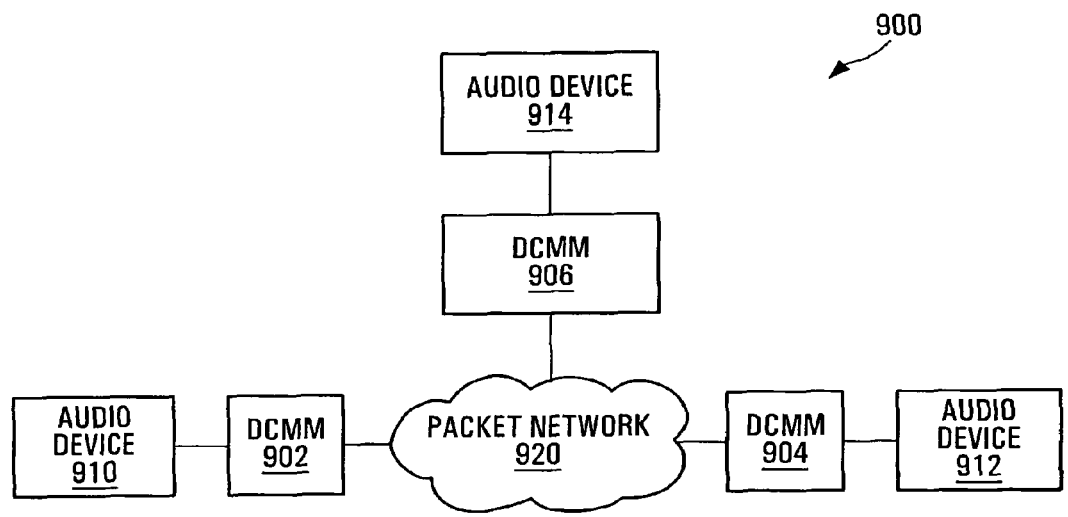
FIG. 1 is a block diagram of one exemplary dispatch system in accordance with an embodiment of the present invention.

FIG. 1 is a block diagram of a dispatch system 900 provided by an embodiment of the present invention. Three audio devices 910, 912, 914 are shown connected to a packet network 920 through three respective distributed call management modules 902, 904, 906.

While three audio devices and three distributed call management modules are shown in FIG. 1, any number of audio devices and distributed call management modules may exist in a dispatch system according to the present invention. As well, it is not necessary that there be one distributed call management module for every audio device. In some embodiments, one distributed call management module may be responsible for more than one audio device. Also, an audio device may be connected to more than one distributed call management module. Preferably, at least one of the audio devices is a radio unit, and at least one of the audio devices is an operator workstation, for handling calls from the radio unit.

The distributed call management modules 902, 904, 906 provide distributed dispatch call processing functionality as described in detail below. Each audio device 910, 912, 914 in the dispatch system 900 is assigned a group address. Audio transmissions from each audio device are transmitted over the packet network to the associated group address. Any second audio device can monitor any first audio device's transmissions by subscribing to the first audio device's group address. In some embodiments, there is also a status group address over which status signals are sent. In some embodiments every distributed call management module is a member of the status group and thus can monitor the status data sent to the status group address. The status data includes all state changes, such as who is transmitting, the idle/busy status of the various entities, etc.

Subscribers to each group address can monitor all transmissions by the audio device to which the group address is assigned. For example if audio device 910 subscribes to the group addresses of the other two audio devices 912 and 914, audio device 910 can monitor all transmissions from the other two audio devices.

To send audio, audio device 910 sends audio and signaling to distributed call management module 902. The distributed call management module 902 converts the audio to packets and sends the packets over the packet network to the group address of the first audio device 910. For the purpose of this example, the other two audio devices 912, 914 have subscribed to the first audio device's group address. The distributed call management modules 904, 906 responsible for the audio devices 912, 914 receive the packets and convert them to an audio format understandable by their respective audio devices. In embodiments where there is a status group address, status information in the signaling sent by audio device 910 may be converted to packets by the distributed call management module 902 and sent to the status group address. In some embodiments real time status information is sent to the first audio device's group address along with the audio packets.

In some embodiments the group addresses are IP multicast group addresses. In some embodiments the multicast group address for each audio device is unique. An audio device, for the purpose of this illustrative description, represents a communication resource within the system. For instance, an audio device may be an individual operator workstation that inputs one physical voice stream into the system at once. Therefore in this example, a single operator represents a single audio device and is thus assigned a single IP multicast group address, regardless of however many entities listen in to this audio device. Similarly, in another example, each radio system inputs a finite set of physical voice streams within the system. In a frequency division multiplex (FDM) system, the number of streams in a set is usually a function of how many discrete carrier frequencies or channels are assigned to the radio system. Therefore in embodiments of the system of the present invention, each radio system would be assigned a finite number of IP multicast group addresses. In some embodiments, each channel in a radio system is assigned a multicast group address. More than one radio unit can use a channel. In that case, transmissions from each radio unit using a particular channel are converted to packets by the distributed call management module responsible for the channel and sent on the multicast group address assigned to the channel. In some embodiments, the distributed call management module that transmits on the multicast group address for a channel is also a member of the multicast group, meaning that radio units using the channel will also hear audio of the other radio units using the channel. In this case, the radio units also receive their own audio, which may be muted to prevent acoustic feedback. Preferably, the distributed call management module is located at a radio station. Also, packets sent to the multicast group address are converted to an RF signal, which is sent by the appropriate radio station to each radio unit using the channel. Furthermore, if a PSTN (Public Switched Telephone Network) is part of the dispatch system, each PSTN line within the dispatch system inputs one physical voice stream within the system, which as is true for the above examples, can actually be a summation of multiple subscriber streams if voice conferencing techniques are utilized in the PSTN in the subscriber equipment. Therefore, each PSTN line would be assigned one IP multicast group address.

Therefore, the number of multicast group addresses is a direct function of the number audio devices, plus one multicast group address used for status data exchange. Given that IP version 4 supports $2^{28}$ individual multicast group addresses, the system capacity permitted by this scheme is for all practical purposes infinite.

The dispatch system preferably utilizes the Internet Group Management Protocol (IGMP) defined in IETF RFC 2236, incorporated herein by reference, in distributed call management modules to control subscription to the multicast group addresses for purposes of receiving audio and status multicasts. This subscription can be done, for example, dynamically for the audio multicasts, on an as-needed basis, derived by the audio management method to be described in detail later. Use of dynamic membership as per IETF RFC 1112, incorporated herein by reference, allows the system to utilize the IGMP pruning features of the IP network infrastructure to limit the packets coming into any given distributed call management module to only those packets that are actually meaningful to that distributed call management module at that given time, regardless of however many multicast packets exist in the IP network.

Audio received by a distributed call management module from each audio device is taken from its "native" form, which is usually, but not limited to, baseband analog audio, and vocoded using a configured vocoder. Possible formats for packetizing the audio include G.711, G.723.1, G.729, GSM, IMBE and TETRA. The resulting audio packets are sent over the appropriate multicast group address preferably using RTP. Any distributed call management module needing access to an audio device performs the opposite process by extracting the audio packets received over the multicast group address and decoding them back into the appropriate format, usually but not limited to baseband analog audio.

Preferably each individual audio device is statically assigned a multicast group address; multicasting towards this address is performed by the distributed call management module from which the audio actually originates. For instance, if a PSTN line is attached to a given distributed call management module, this distributed call management module originates multicast packets for this resource, which can comprise a packetized version of the audio coming into the distributed call management module from the PSTN line. When two audio devices are in communication with each other, they each subscribe to the other's multicast group and each multicast group address carries half of the conversation. For example, if audio device 910 is communicating with audio device 912 in FIG. 1, audio device 910 subscribes to audio device 912's multicast group and audio device 912 subscribes to audio device 910's multicast group. Distributed call management module 902 converts audio from audio device 910 and sends it over audio device 910's multicast group address. Distributed call management module 904 converts audio from audio device 912 and sends it over audio device 912's multicast group address.

In some embodiments, all of the multicast group addresses are static and stored in a database, which can be accessed by the distributed call management modules.

Many benefits result from the approach described herein. First, regardless of how many entities are present within the network, each distributed call management module need only be able to handle enough simultaneous multicast groups to support the maximum simultaneous communication requirements for that distributed call management module. For instance, if a system includes 100 PSTN lines, but an operator is only required to support a 6-line conference, then the distributed call management module supporting the operator needs only to support 6 simultaneous multicast groups, in addition to the multicast group used for status data exchange.

This approach also drastically diminishes the bandwidth and processor requirements of each individual distributed call management module and provides much greater modularity compared to traditional, centralized audio processing approaches. This is because, for example, generally operational requirements for the maximum number of simultaneous communications per entity remain constant as entities are added to the system, as they are set by individual entity limitations (e.g. the ability of a single operator to listen in to multiple conversations simultaneously, or the ability of a PSTN line to support conferencing of multiple entities) rather than limitations by the number of resources accessible.

As indicated above, preferably the audio devices include radio units and operator workstations. Preferably, each operator workstation continuously monitors a plurality of radio channels; i.e. it is permanently subscribed to the radio channels' multicast group addresses. By monitoring the status group address, an operator workstation is aware of all traffic taking place and can choose to join the appropriate multicast group address in order to join in on an ongoing conversation using a method that will be discussed below.

In a dispatch environment, a radio call on a radio channel is monitored by multiple operator units. Preferably, the distributed call management modules have the functionality to decide which operator will handle a given call, referred to hereinafter as "arbitration".

Figure 2:
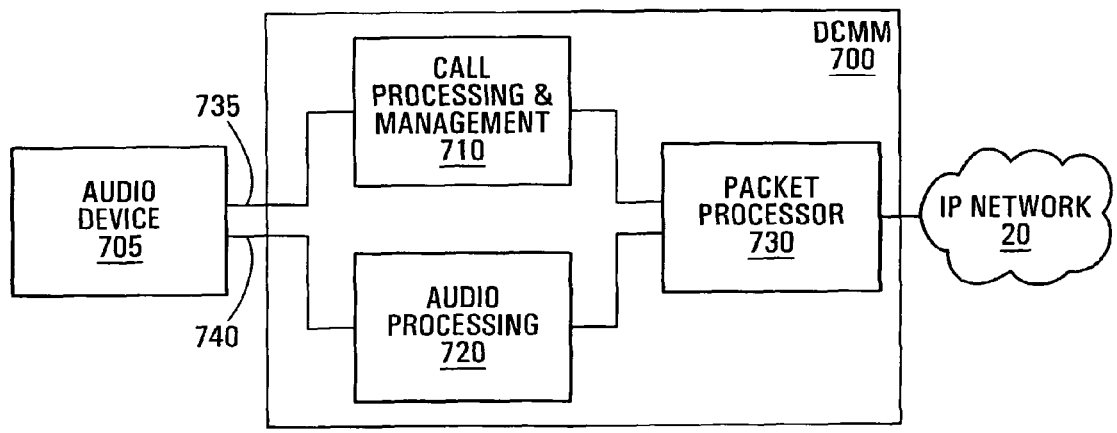
FIG. 2 is a block diagram of a distributed call management module in accordance with an embodiment of the present invention.

FIG. 2 is a block diagram of an embodiment of a distributed call management module 700 in accordance with the present invention. The distributed call management module does IP processing so that audio devices can communicate over the IP network 20 using IP multicast groups and IP packets. The distributed call management module comprises a call processing and management engine 710, an audio processing engine 720 and a packet processor 730. Audio interface 740 connects the audio processing engine 710 to an audio device 705. Signaling interface 735 connects the call management and processing engine 720 to the audio device 705.

The call processing and management engine 710 and the audio processing engine 720 are shown connected in parallel between the packet processor 730 and the audio device 705. However, this is for illustrative purposes only. The functions represented by the call processing and management engine 710, audio processing engine 720 and packet processor 730 are simply a logical breakdown of the functions performed by the distributed call management module 700. In some embodiments the audio processing engine 720 is subordinate to the call processing and management engine 710. In some embodiments audio and signaling interfaces 740, 735 are on one line.

In other embodiments, the distributed call management module 700 also has a gateway connecting the call processing and management engine and the audio processing engine to the audio device. The function of the gateway will be discussed below with reference to FIG. 9.

The distributed call management module 700 can be any combination of hardware and/or software designed to implement the described functions. In some embodiments, the distributed call management module includes a software module operating on a personal computer. In other embodiments, the distributed call management module includes a software module operating on a dedicated hardware module. The software module operates with a graphical user interface in some embodiments.

Distributed call management modules can be located throughout a dispatch system, such as shown in FIG. 1. In some embodiments, there are distributed call management modules located in radio sites and dispatch centers. Distributed call management modules can also be located on an operator workstation.

In some embodiments the distributed call management module interfaces with the audio devices using MGCP or MEGACO protocols. The interface can also be through interface cards located with a chassis in the distributed call management module. In the case of virtual telephone lines, the distributed call management module can use H.323 or SIP protocols over an IP network.

In operation, the packet processor 730 packetizes signals from the call processing and management engine 710 and the audio processing engine 720 and transmits IP packets over the IP network 20. The packet processor 730 also receives IP packets from the IP network and transmits them to the audio processing engine 720 and call processing and management engine 710, as appropriate.

The call processing and management engine 710 performs a control function. The call processing and management engine 710 subscribes to IP multicast groups and performs arbitration functions. In some embodiments, the call processing and management engine 710 also converts status signals from the audio device for transmittal to a status IP multicast group, having all of the distributed call management modules in the system as members Likewise, in some embodiments, status signals received as IP packets from the IP network are converted by the call processing and management engine 710 to a form understandable by the audio device.

In some embodiments, the call processing and management engine 710 communicates with call processing and management engines in other distributed call management modules for the purpose of distributed control of the system. The call processing and management engines of a dispatch system collaborate to ensure that a failure of one distributed call management module will not affect the operation of the dispatch system, apart from those components directly connected the particular distributed call management module in which the failure took place. In some embodiments, this is achieved by standby distributed call management modules. For example, a radio station may be connected to a main and an alternate distributed call management module, with only one connection active at a time. If the main distributed call management module fails, the radio station is switched over to the alternate distributed call management module. In other embodiments, if one distributed call management module fails, traffic is rerouted to another distributed call management module and the affected distributed call management module is put out of service.

The audio processing engine 720 provides an audio summation function. If a given audio device is subscribing to multiple multicast groups that are transmitted simultaneously, the audio from these sources is summed and presented as a single audio signal to the given audio device. The audio processing engine also converts the audio signals from the audio device to an IP protocol signal and sends them to the packet processor 730 to be packetized and sent to the IP network. The audio processor 720 also converts signals from the packet processor 730 into audio signals understandable by the audio device.

In the illustrative embodiments discussed herein, the method used by the distributed call management modules connected to the IP network to exchange audio and status information comprises assigning an IP multicast group address (RFC 1112) to be shared by the distributed call management modules for status data exchange and a IP multicast group address (RFC 1112) per separate audio device. This method enables the establishment of point-to-point, point-to-multipoint or multipoint-to-multipoint audio exchanges between entities.

The architecture of the systems described herein makes reconfiguration of any audio device possible without system interruption. As well, addition of another audio device is possible without system interruption. Also, the IP network can isolate any distributed call management module without affecting the rest of the dispatch system. Restarting of any distributed call management module is possible without restarting the entire dispatch system. Therefore, failure of any one distributed call management module only affects the behaviour of that particular distributed call management module.

Figure 3:
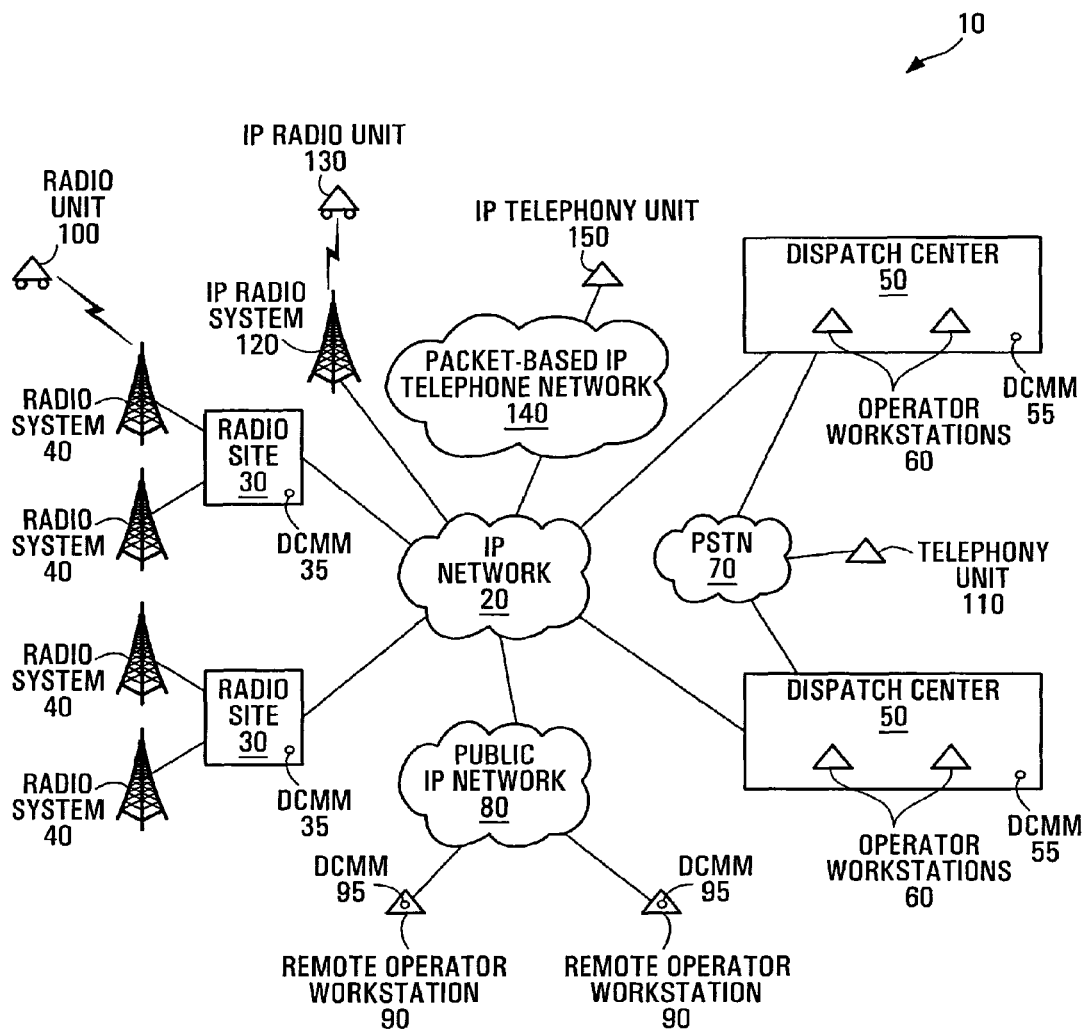
FIG. 3 is a block diagram of one exemplary radio dispatch system in accordance with an embodiment of the present invention.

FIG. 3 depicts one exemplary radio dispatch system 10 in accordance with an embodiment of the present invention. The radio dispatch system 10 comprises an IP network 20, radio sites 30 coupled to radio systems 40, dispatch centers 50 that include operator workstations 60, PSTN 70, a public IP network 80, remote operator workstations 90, a radio unit 100, a telephony unit 110, which can be a wireline or a wireless unit, an IP radio system 120, an IP radio unit 130, a packet-based IP telephone network 140, and an IP telephony unit 150. Distributed call management modules 35 are provided in the radio sites 30, distributed call management modules 55 are provided in dispatch centers 50 and distributed call management modules 95 are provided in remote operator workstations 90. The distributed call management modules 35, 55, 95 provide distributed dispatch call processing functionality as described herein. In some embodiments the IP network 20 is an ATM (Asynchronous Transfer Mode) network. In other embodiments the IP network 20 is a Frame Relay Network. In some embodiments, the radio systems 40 are land mobile radio systems. In some embodiments the public IP network 80 is the Internet.

FIG. 3 shows a very specific example implementation of an embodiment of the invention. Other embodiments comprise any combination of audio devices and distributed call management modules connected to an IP network. For example, FIG. 3 shows two radio sites 30 connected to the IP network 20. In other embodiments any number of radio sites can be connected to the IP network. Distributed call management modules 35 are shown in the radio sites 30. In other embodiments, the distributed call management modules are not co-located with the radio site. For example, the distributed call management modules 35 can be located between the radio site and the IP network. FIG. 3 shows two radio systems 40 for each radio site 30. In other embodiments, any number of radio systems 40 can be connected to each radio site 30. FIG. 3 shows one radio unit 100 in communication with a radio system 40. Any number of radio units 100 may exist. FIG. 3 also shows one IP radio unit 130 and one IP radio system 120. It is understood that any number of IP radio units 130 and IP radio systems 120 are possible in other embodiments. Only one IP telephony unit 150 and one packet-based IP telephone network 140 are shown. In other embodiments, any number of IP telephony units 150 and packet-based IP telephone networks 140 are possible. As well, each packet-based IP telephone network 140 may be linked to a plurality of IP telephony units 150. Two dispatch centers 50 are shown in FIG. 3. Any number of dispatch centers 50 is possible in other embodiments. Each dispatch center 50 shown in FIG. 3 has two operator workstations 60 and one distributed call management module 55. In other embodiments the dispatch centers 50 can have any number of operator workstations 60 and distributed call management modules 55. Furthermore, distributed call management modules 55 can be located outside the dispatch centers 50. FIG. 3 also shows only one telephony unit 110 connected to PSTN 70. Any number of telephony units 110 can be connected to the PSTN 70. Likewise, any number of PSTN's can exist. The PSTN 70 is shown connected to two dispatch centers 50. The PSTN can be connected to the IP network through any number of dispatch centers or through a distributed call management module located exterior to a dispatch center. FIG. 3 shows two remote operator workstations 90 and one public IP network 80. Any number of remote operator workstations 90 and any number of public IP networks 80 are possible. The remote operator workstations 90 are shown having distributed call management modules 95 located on the workstations 90. Distributed call management modules 95 can be located exterior to the remote operator workstations 90. Although not shown, the system may also include a system manager capable of system maintenance, administration and configuration. In some embodiments, the system is partitioned so that any one audio source has access to only a defined subset of system resources.

Preferably, the operators of the workstations 60 or 90 are monitoring all traffic from a number of radio channels. To achieve this, each operator subscribes to the IP multicast group of each channel it needs to monitor.

The example of FIG. 3 shows radio calls from radio units that are IP radio units and/or non-IP radio units. Some embodiments include only non-IP radio units. Other embodiments include only IP radio units. The capability to handle remote workstations connected to the public IP network is included in the FIG. 3 embodiments. Other embodiments include only stationary workstations. Still other embodiments include only remote workstations. The telephony interfaces, shown in FIG. 3 are both PSTN and IP-based. Some embodiments have only PSTN telephony interfaces. Other embodiments have only IP-based telephony interfaces. Other embodiments have only radio interfaces and no telephony interfaces.

The following are specific examples of some of the types of communication that are possible within the radio dispatch system of FIG. 3.

Radio Call Example

Referring to FIG. 3, in operation, a radio unit 100 can initiate a radio call, which can be a voice transmission, a data transmission or any combination thereof. The call is routed via RF to radio system 40, then through radio system 40 to a radio site 30. In the example shown in FIG. 3, the communication between the radio system 40 and the radio site 30 is over a physical circuit. The distributed call management module 35 at the radio site 30 converts the radio call to IP packets for transmission to and reception by entities connected to the IP network 20, using a method to be described in detail later. The IP packets are transmitted by IP multicast or a similar mechanism that results in each packet being forwarded to multiple destinations simultaneously. The distributed call management modules of the audio devices that have subscribed to the multicast address, for example particular operator workstations 60 or 90, will receive the packets and can then subsequently monitor the radio call. Preferably, each radio channel is monitored by a respective plurality of operator workstations. For example, the call audio might be directed to a headset or speaker and the call data can be displayed at such workstations.

Operator Workstation Example

In a further example, an operator of an operator workstation 60 or 90 can initiate a radio call to a group of one or more radio units 100, which can be a voice transmission, a data transmission or any combination thereof. Once again, the transmission is converted to IP packets and the IP packets are sent over the IP network using IP multicast or a similar mechanism to the one or more radio units. The IP packets are routed by distributed call management module 55 or 95 through the IP network 20 to one or more radio sites 30, where distributed call management modules 35 convert them to audio and data signals. The audio and data signals are then directed by the distributed call management modules 35 to the radio system 40 for broadcasting over the RF network and receiving by radio units 100.

Telephony Unit Example

In yet another example a telephone unit 110 can initiate a telephone call. As shown in the FIG. 3 embodiment, such call is routed through the PSTN 70 to the dispatch centers 50, where it is routed through distributed call management module 55. The routing from the telephone unit 110 to the PSTN 70 can include the use of physical circuits. The dispatch centers 50 determine the proper operator workstation 60 or 90 to which to present the call, based on call distribution rules preset in accordance with the mandates of the dispatch system. The operator workstation 60 or 90 can then be used to answer the call. Similarly, an operator workstation 60 or 90 can place a call to a telephone unit 110 through distributed call management module and the PSTN 70.

IP Radio Example

In the example shown in FIG. 3, a radio unit 130 on an IP radio system 120 can initiate a radio call to a group of operators, which can be a voice transmission, a data transmission or any combination thereof. Such a call can be routed via RF to radio system 120, then through to a radio site 30, where the communication between the IP radio system 120 and the radio site 30 is over the IP network. The distributed call management module 35 at radio site 30 converts packets received from IP radio system 120 to multicast packets and relays the IP packets from radio system 120 for processing by entities connected to the IP network 20, using a method to be described in detail later. This architecture allows the radio site 30 to operate with not only legacy systems such as radio systems 40, but also IP radio systems 120, in which case instead of the hard-wired connection as between the radio system 40 and the radio site 30, there is a virtual connection via the IP network 20 between the IP radio system 120 and the radio site 30. Any operator using an operator workstation 60 or 90 receiving the packets can then subsequently monitor the radio call.

Operator Workstation to IP Radio Unit Example

In the exemplary embodiment shown in FIG. 3, an operator workstation 60 can initiate a radio call to IP radio unit 130, which can be a voice transmission, a data transmission or any combination thereof. Such a call can be routed through distributed call management module 55 to the IP network 20 to a distributed call management module 35 at a radio site 30 to an IP radio system 120. The operator voice is then directed to the radio system 120 for broadcasting over the RF network and receiving by radio unit 130.

IP Telephony Unit Example

In the exemplary embodiment shown in FIG. 3, an IP telephony unit 150 can initiate a telephone call. Such a call can be routed through the IP telephone network 140 to the dispatch centers 50, using the IP network 20. The distributed call management modules 55 at dispatch centers 50 determine the proper workstation 60 or 90 to which to present the call, based on preset call distribution rules. The workstation 60 or 90 can then be used to answer the call. Similarly, an operator workstation 60 or 90 can select a telephone line on which to place a call to an IP telephone unit 150 through IP telephone network 140.

The above mentioned scenarios are merely examples of the types of communications that can be accomplished with the exemplary system. Depending upon implementation specifics, other combinations of audio devices may also be connected, such as and without limitation:

Any combination of operator workstations can be connected together in an intercom call. An intercom call is a call between operators that does not go through telephone lines;

Any combination of operator workstations can be connected together with any combination of telephone lines to form a telephone conference;

Any combination of telephone lines can be connected together to form an unattended telephone conference;

Any combination of radio channels can be connected towards any combination of operator workstations for the purpose of monitoring or listening in to radio channels;

Any operator workstation can be connected towards any combination of radio channels for the purpose of transmitting over radio channels;

Any combination of radio channels can be connected together in a radio patch; and Any combination of radio channels and any combination of telephone lines can be connected together in a telephone/radio patch.

Those skilled in the art will readily recognize that in addition to the above example combinations, there are other combinations that can be supported by a system such as the one shown in FIG. 3.

Three Way Conference Example

In another example, to enable an operator sitting at an operator workstation to converse with a subscriber on a PSTN line, the distributed call management module responsible for the workstation subscribes to the IP multicast group for the PSTN line, and converts the IP packets to audio for the operator headset or speaker. In turn, the distributed call management module responsible for the PSTN line subscribes to the IP multicast group for the operator workstation, and converts the IP packets to audio for transmitting towards the PSTN line. Thus all audio exchange between the two distributed call management modules is in the form of IP packets to two IP multicast group addresses, with half of the conversation carried by each IP multicast group address.

A second operator monitoring the status group address may decide to join in the conversation. Alternatively, the first operator may invite the second operator to join. To enable a second operator to join the conversation, the distributed call management module responsible for the second operator workstation subscribes to the IP multicast group of the first operator workstation and the IP multicast group of the PSTN line, and combines the packets by audio summation techniques for transmission towards the second operator's headset or speaker. Simultaneously, the distributed call management module responsible for the first operator workstation subscribes to the IP multicast group for the second operator workstation and sums the second operator workstation's audio with the PSTN line audio towards the first operator's headset or speaker, and the distributed call management module responsible for the PSTN line subscribes to the multicast group for the second operator workstation and sums the second operator workstation's audio with the first operator workstation's audio towards the PSTN line.

Figure 4:
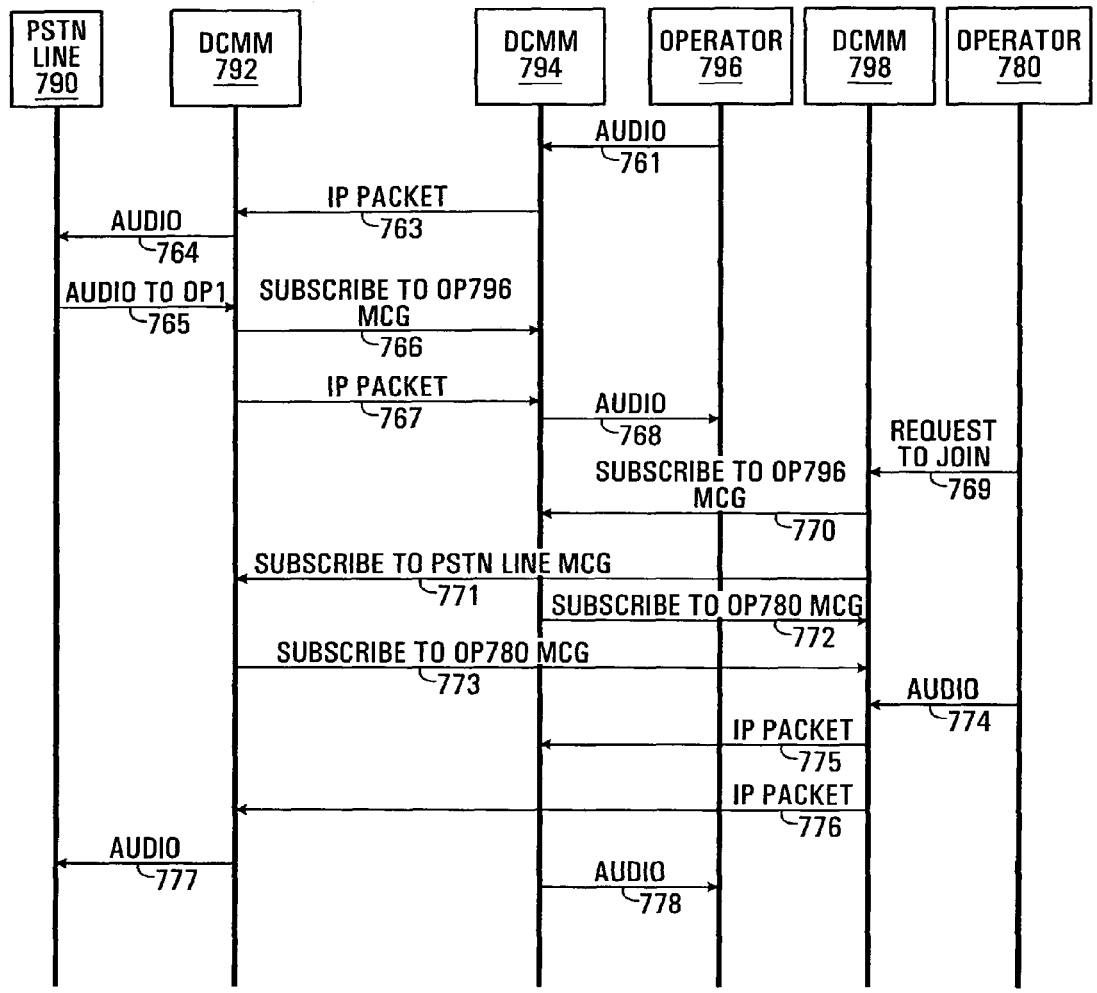
FIG. 4 is a signal chart for a method of one embodiment of the present invention.

The signal chart of FIG. 4 shows an example of signaling to initiate the three way conference of the last example. For the purpose of this example, only the audio signals are discussed. In some embodiments status signals and status IP packets are also sent and received.

FIG. 4 shows signals being sent and received by a PSTN line 790, a distributed call management module 792 responsible for the PSTN line 790, an operator workstation 796, a distributed call management module 794 responsible for the operator workstation 796, another operator workstation 780 and a distributed call management module 798 responsible for the operator workstation 780.

As can be seen, an audio signal 761 from the first operator workstation 796 to the PSTN line 790 is sent through the distributed call management module 794, which converts the audio to IP packets. The distributed call management module 794 sends the IP packets 763 over operator workstation 796's IP multicast group address. The distributed call management module 792 converts the IP packets to an audio signal and sends the audio signal 764 to the PSTN line 790. Audio 765 from the PSTN line 790 is sent back through the distributed call management module 792, where it is converted to IP packets 767. The distributed call management module 792 sends a subscription signal 766 for the IP multicast group of the first operator workstation 796 and transmits the IP packets 767 to the IP multicast address of the PSTN line 790. The distributed call management module 794 responsible for the first operator workstation 796 receives the IP packets 767, converts them to an audio signal 768 and sends the audio signal 768 to the first operator workstation 796.

When the second operator workstation 780 requests to join or is invited to join the conversation, a request signal 769 is sent through the distributed call management module 798, which then sends a subscription signal 770 for the IP multicast group of the PSTN line 790 and a subscription signal 771 for the IP multicast group of the first operator workstation 796. The distributed call management modules 792, 794 then subscribe 772, 773 to the IP multicast group of the second operator workstation 780. Then audio 774 from the second operator workstation 780 is converted to IP packets 775, 776 and sent to the second operator workstation 780's IP multicast group address. Preferably, IP packets 775 and 776 are sent as a single packet using multicast techniques. The IP packets 775 are received by distributed call management module 792 and converted to audio signal 777 and sent to PSTN line 790. The IP packets 776 are received by distributed call management module 794 and are converted to audio signals 778 and sent to the first operator workstation 796.

In this example, audio from each of the three participants is broadcast to the other two participants, thus creating a three-way conference call. Any one of the operator workstations or the PSTN line can unsubscribe from the IP multicast groups of the other two participants at any time and the conversation between the other two participants can continue.

By using the method described above any number of audio devices can communicate with each other at any one time.

Another implementation of the present invention is a method of dispatching a call in a dispatch system, such as a 911 dispatch system. In a 911 dispatch system, each operator is responsible for monitoring a number of RF channels. In embodiments of the present invention, each channel has its own IP multicast group address. Furthermore, the present invention is not limited to RF channels. Any audio device with an IP multicast group address can be monitored. Operators responsible for monitoring a particular channel subscribe to that channel's IP multicast group address. When an emergency call is received on one of the channels, each operator who has subscribed to that channel's IP multicast group will hear the call and can decide to respond or not.

Figure 5:
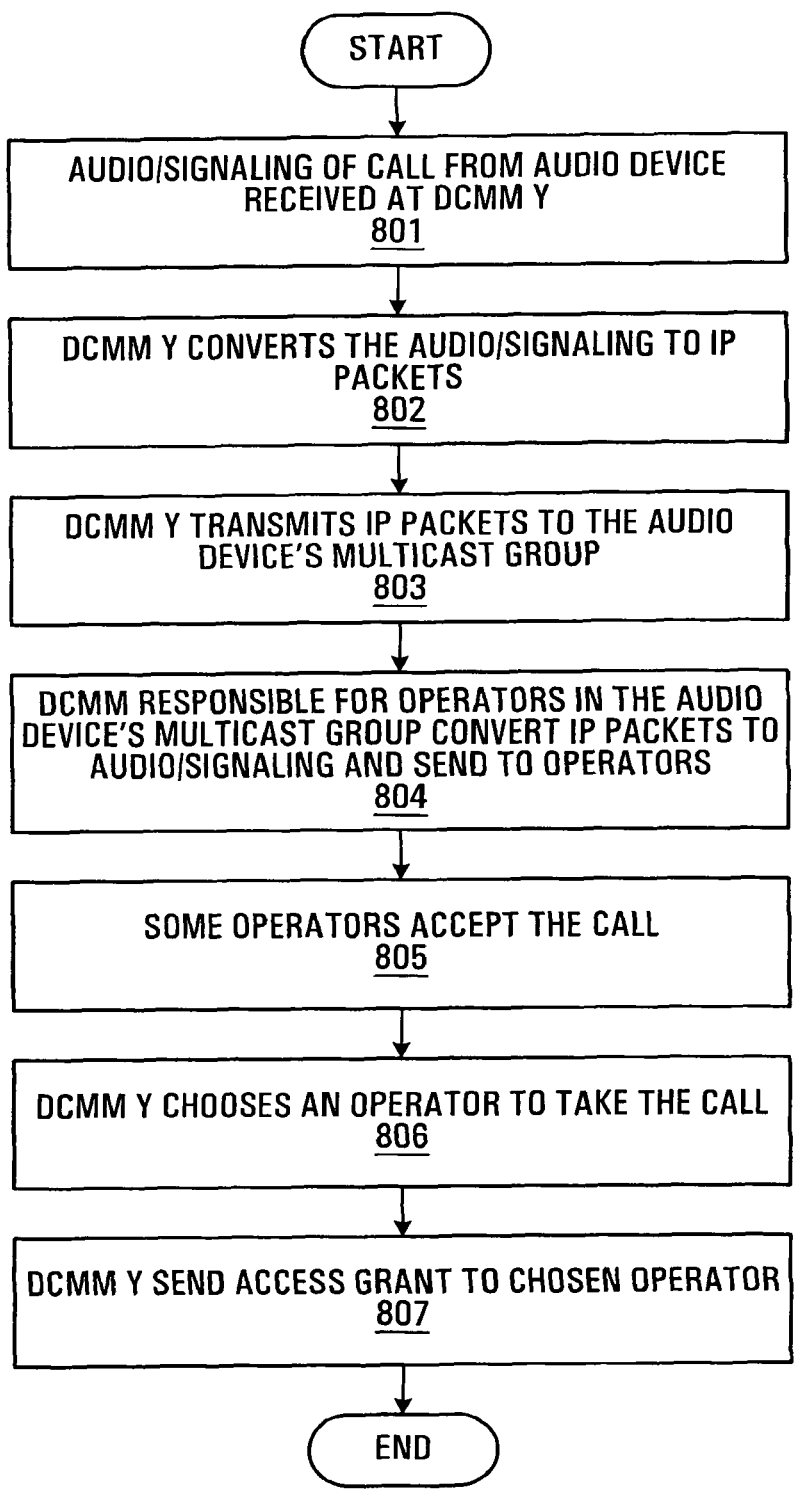
FIG. 5 is a flowchart of a method in accordance with an embodiment of the present invention.

A flowchart of an embodiment of a 911 dispatch method is shown in FIG. 5. Audio/signaling for a call comes in to distributed call management module Y from an audio device (Step 801). Distributed call management module Y converts the audio/signaling to IP packets (Step 802). Distributed call management module Y then transmits the IP packets to the IP multicast group associated with the audio device (Step 803). The distributed call management modules responsible for the operator workstations in the audio device's IP multicast group convert the IP packets to a format understandable by their respective operator workstations (Step 804). The operator workstations can then receive the audio.

Some operator workstations accept the call (Step 805). The acceptances go back through the distributed call management modules responsible for each operator workstation to the distributed call management module Y. In the event multiple acceptances are received, distributed call management module Y selects one operator workstation to take the call (Step 806). The distributed call management module responsible for channel Y then sends a channel access grant to the selected operator workstation (Step 807). In some embodiments, channel access denials are sent to the other operator workstations that accepted the call. The grant and denials are processed by each operator workstation, and in some embodiments an appropriate indicator is generated in the form of an audio or visual signal. The selected operator workstation is now free to transmit over the channel.

If the selected operator workstation wishes to broadcast to other channels, the distributed call management module responsible for the selected operator workstation subscribes to the IP multicast groups of the other channels and sends the IP packets to all of the distributed call management modules responsible for the channels that the selected operator workstation chose.

In some embodiments, priorities for callers on a channel are set by an administrative interface. The distributed call management module responsible for a channel can do arbitration according to preset rules to determine which caller is granted access. In some cases, a caller with a higher priority can preempt a caller who is already using the channel. In some embodiments, the distributed call management module responsible for the channel can conduct this preemption function.

Figure 6:
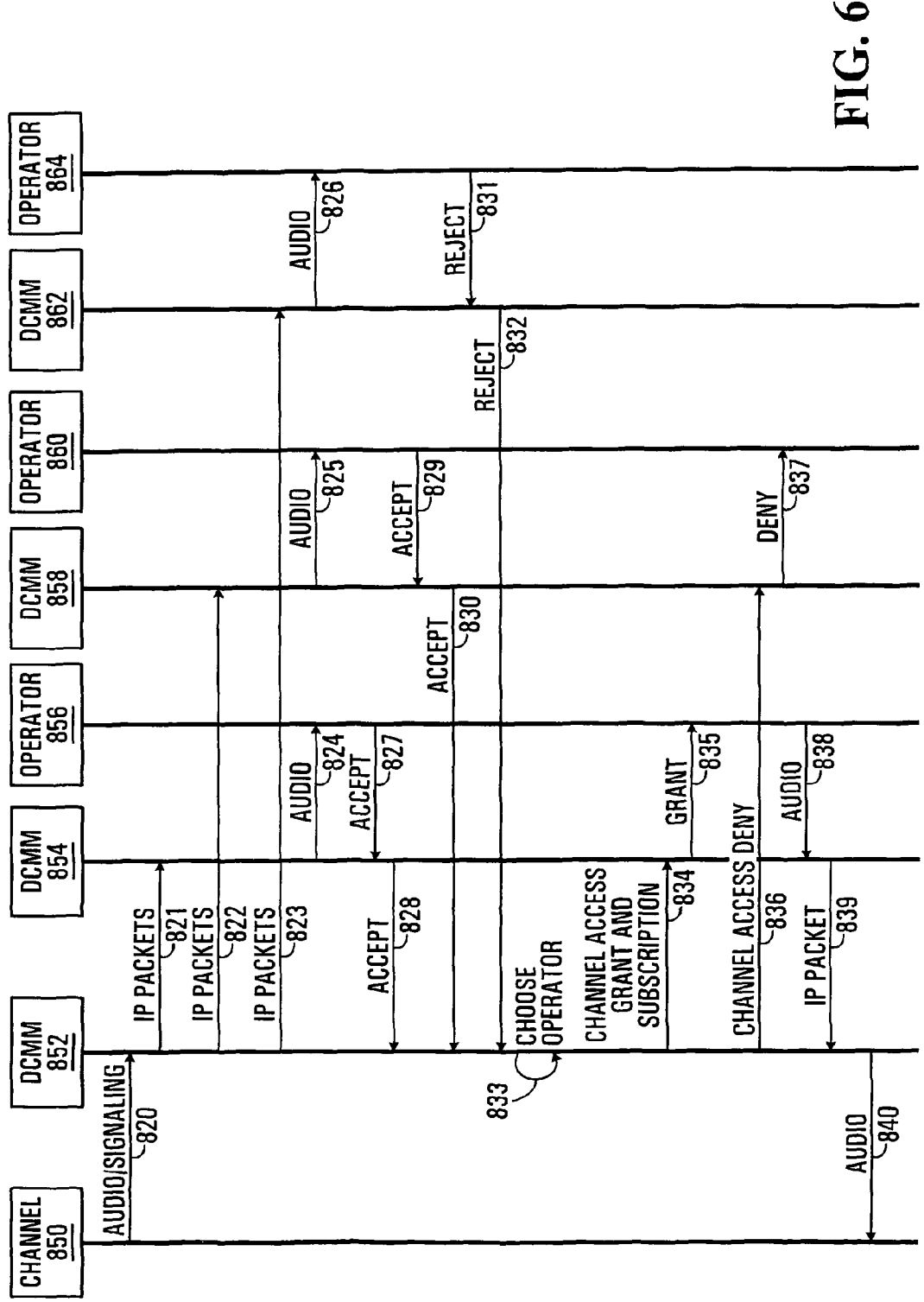
FIG. 6 is a signal chart for a method of an embodiment of the present invention.

FIG. 6 is a signal chart for an example 911 call dispatch. FIG. 6 shows signals being sent and received by channel 850, distributed call management module 852, distributed call management module 854, operator workstation 856, distributed call management module 858, operator workstation 860, distributed call management module 862 and operator workstation 864. Distributed call management module 862 is the distributed call management module responsible for operator workstation 864. Distributed call management module 858 is the distributed call management module responsible for operator workstation 860. Distributed call management module 854 is the distributed call management module responsible for operator workstation 856. Distributed call management module 852 is the distributed call management module responsible for channel 850.

For illustrative purposes, it is assumed that the three operator workstations 856, 860 and 864 have subscribed to the IP multicast group associated with channel 850. As can be seen the call 820 comes in on the channel 850 to distributed call management module 852. Distributed call management module 852 converts the audio and signaling of the call to IP packets and sends the IP packets 821, 822, 823 to the IP multicast group of the channel 850. Preferably, IP packets 821, 822, and 823 are sent as a single packet using multicast techniques. Distributed call management modules 854, 858, and 862 receive the IP packets and convert them to audio and signaling. The distributed call management modules 854, 858, and 862 send the converted signals 824, 825, 826 to their respective operator workstations 856, 860 and 864. Operators 856 and 860 are shown sending acceptance signals 827, 829 to distributed call management modules 854 and 858 respectively. Operator workstation 864 is shown sending a rejection signal 831 to distributed call management module 862 rejecting the call. Distributed call management modules 854 and 858 convert the acceptances and send them to distributed call management module 852 as IP packets 828 and 830, respectively. Distributed call management module 862 converts the rejection signal to IP packets 832 and sends the IP packets 832 to distributed call management module 852. Distributed call management module 852 then chooses an operator workstation to take the call 833. In this example operator workstation 856 is chosen as the operator workstation to take the call. Next a channel access grant signal 834 is sent to distributed call management module 854 along with a subscription to operator workstation 856's IP multicast group. Distributed call management module 854 converts the signal and sends the converted signal 835 to operator workstation 856. A channel access denial signal 836 is sent to distributed call management module 858, where it is converted. The converted denial 837 is sent to operator workstation 860. Operator workstation 856 then commences transmitting an audio signal 838. The audio signal 838 goes to distributed call management module 854, where it is converted to IP packets 839 and sent to distributed call management module 852. Distributed call management module 852 converts the IP packets 839 to an audio signal 840 and sends the audio signal 840 over channel 850.

In some embodiments, each operator workstation is monitoring a number of channels. An operator workstation can also transmit on the channels which the operator workstation is monitoring. To transmit to all the channels, the operator workstation makes a request to each channel, indicating at the same time the operator workstation's IP multicast group address. When access is granted on a channel by channel basis, each channel subscribes to the operator workstation's IP multicast group and transmission can begin at the same time. In some embodiments the acceptance signal is tied to a Push-to-talk switch, in which case arbitration takes place on a transaction by transaction basis. In other words, there is no arbitration for the entire call.

Figure 7:
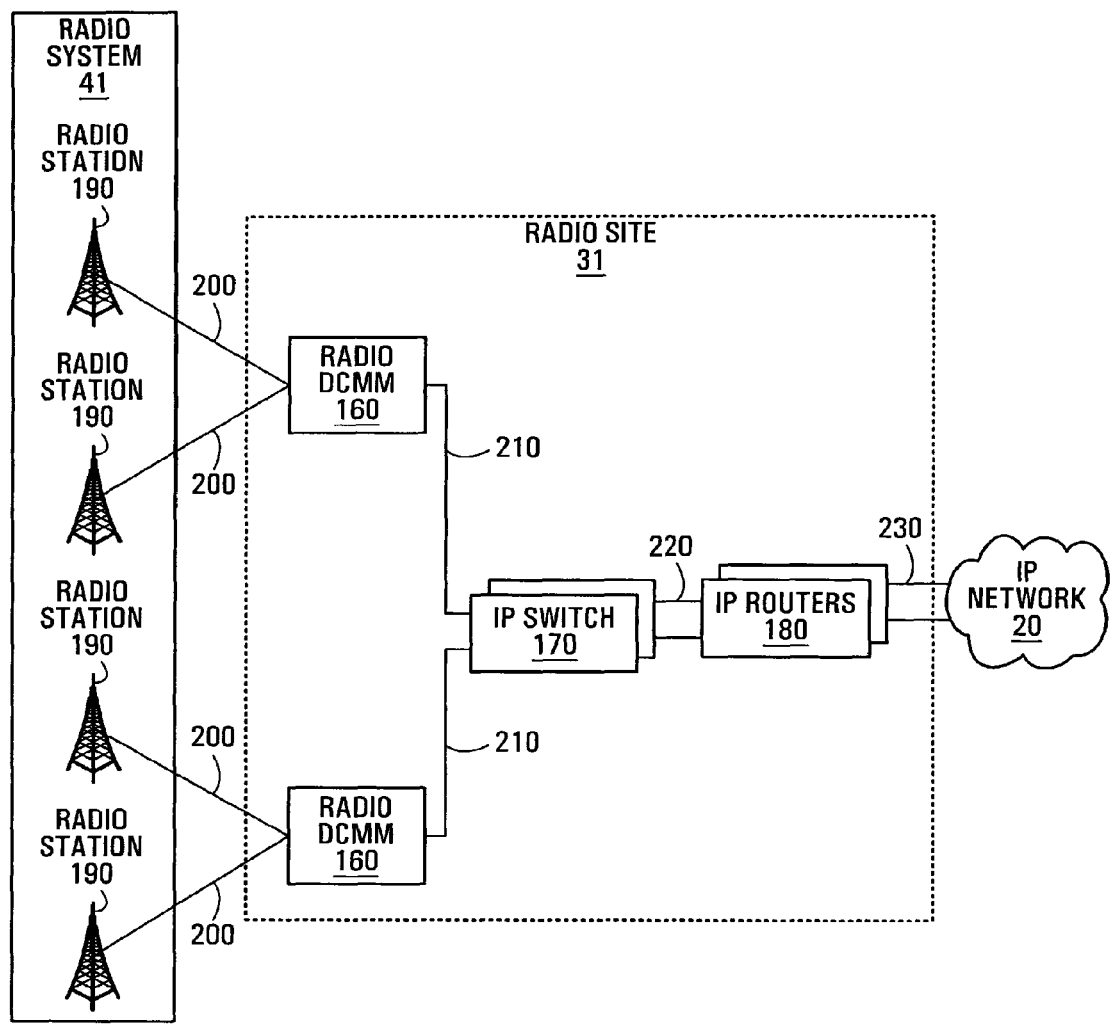
FIG. 7 is a block diagram of one exemplary radio site in accordance with an embodiment of the present invention.
Figure 8:
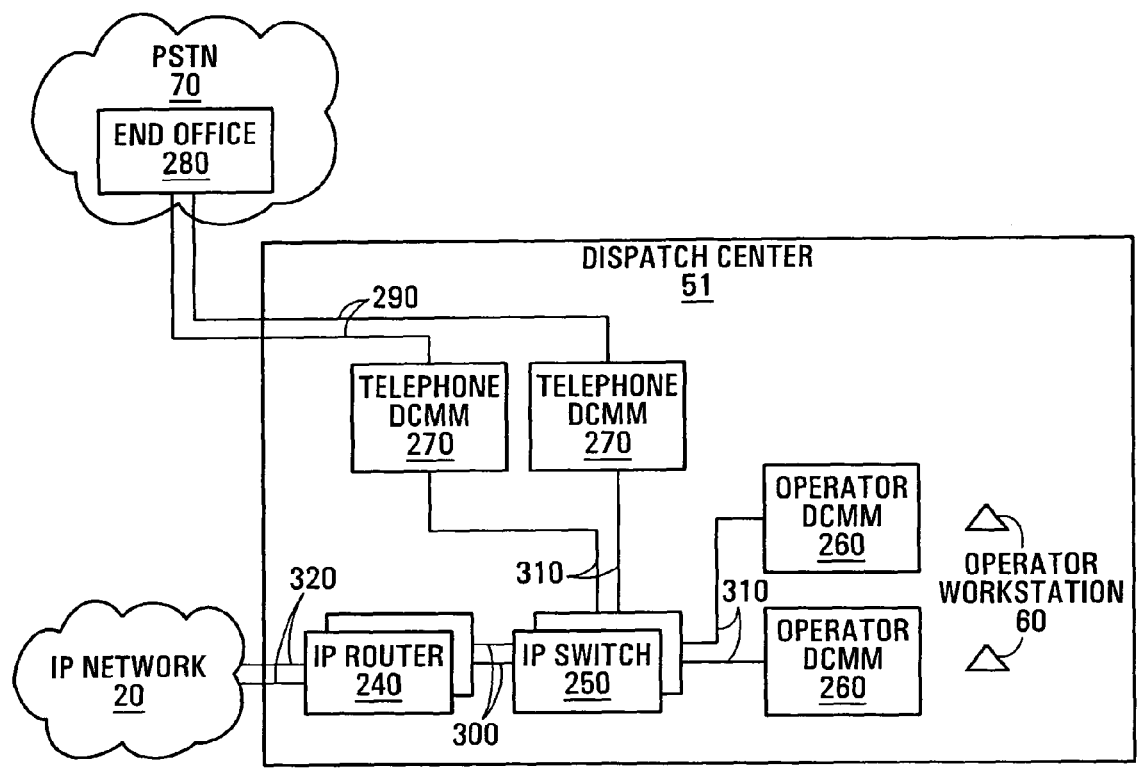
FIG. 8 is a block diagram of one exemplary dispatch center in accordance with an embodiment of the present invention.

As mentioned earlier, distributed call management modules can be distributed throughout a dispatch system. FIGS. 7 and 8 show distributed call management modules located in a radio site and a dispatch center. Of course, distributed call management modules can be located in many other locations.

FIG. 7 depicts one exemplary radio site in accordance with the present invention. In the FIG. 7 example, a radio site 31 comprises a plurality of radio distributed call management modules 160, redundant IP switches 170, and redundant IP routers 180. Radio distributed call management modules 160 are distributed call management modules designed to interface between a radio system and an IP network.

The radio site 31 communicates with the radio stations 190 in the radio system 41 via radio interfaces 200. The radio distributed call management modules 160 communicate with the IP switches 170 via LAN connections 210. In some embodiments the LAN connections 210 are Ethernet connections. The IP switches 170 communicate with the IP routers 180 via redundant LAN connections 220. The IP routers 180 communicate with the IP network 20 via redundant WAN connections 230. In various embodiments the WAN connections 230 can be ATM or Frame Relay links over copper, optical or wireless connections.

In the FIG. 7 example, when a radio call arrives at the radio site 30 over a radio interface 200, it is processed by a radio distributed call management module 160. The radio distributed call management module 160 interprets the signaling of the radio call and converts the call status data to an IP packet and multicasts the IP packet to all distributed call management modules of the system using a status multicast group. In some embodiments the status multicast group is an IP multicast group that is subscribed to by all distributed call management modules and is used to multicast status changes. The radio distributed call management module 160 also converts the audio to RTP (Real-time Transport Protocol) and sends it over the designated IP multicast group for the particular radio channel.

As will be recognized by those skilled in the art, the call signaling is radio system specific and can include combinations of "talk and listen" signaling such as call indication, advanced conventional signaling such as unit ID, emergency, and trunked system signaling such as individual call or unit status. As an example of the status conversion in the illustrative distributed system, status changes as a result of received signaling are multicast to all distributed call management modules for the distributed call management modules to update their local status database and subsequent presentation to an operator workstation.

Radio distributed call management modules 160 can also provide radio calls over a radio interface 200, at the request of an operator workstation within the system or for a non-operator-initiated transmission, such as a patch or radio repeat transmission. In such a case, the signaling can be originated by the radio distributed call management module 160 towards the radio interface 200, and the audio can be taken from its RTP form on an IP multicast group address and converted for transmission towards the radio interface 200.

In the FIG. 7 example, the IP switches 170 serve as packet switches for the radio site 30, by directing packets coming over the LAN connections 210 and 220 from the radio distributed call management modules 160 and routers 180 to the destinations over the LAN connections 210 and 220. For instance, a radio distributed call management module 160 could send an IP packet to a specific IP multicast group address, in which case an IP switch 170 would receive the IP packet on a LAN connection 210 and forward it on all LAN connections 210 and 220 that subscribe to the IP multicast group.

In the FIG. 7 example, the WAN routers 180 serve to bridge the radio site LAN with the IP network 20. To this end, they can perform translation from the LAN protocol to the IP network protocol, as well as NAT (Network Address Translation) and firewall functions as appropriate.

FIG. 8 depicts one exemplary dispatch center 51 in accordance with the present invention. Dispatch center 51 preferably comprises redundant IP routers 240, redundant IP switches 250, a plurality of operator distributed call management modules 260 serving operator workstations 60, a plurality of telephone distributed call management modules 270 operatively coupled via telephone lines 290 to an end office 280 that is in the PSTN 70. Operator distributed call management modules 260 are distributed call management modules that interface between operator workstations 60 and an IP network 20. Telephone distributed call management modules 270 are distributed call management modules that interface between a PSTN 70 and an IP network 20.

In the FIG. 8 example, the IP routers 240 and IP switches 250 preferably communicate via redundant LAN connections 300. The IP switches 250, operator distributed call management modules 260 and telephone distributed call management modules 270 preferably communicate via LAN connections 310. The IP routers 240 communicate with the IP network 20 via redundant WAN connections 320. In some embodiments, the WAN connections 320 are ATM or Frame Relay links over copper or optical connections.

In FIG. 8, the IP switches 250 serve as the packet switches for the dispatch center 51, by directing packets coming over the LAN connections 300 and 310 from the WAN routers 240, telephone distributed call management modules 270 and operator distributed call management modules 260 to the destinations over the LAN connections 300 and 310. For instance, a telephone distributed call management module 270 could send an IP multicast packet to a specific IP multicast group address, in which case an IP switch 250 would receive the packet on a LAN connection 310 and forward it on all LAN connections 300 and 310 that subscribe to this IP multicast group.

In FIG. 8, the telephone distributed call management modules 270 terminate telephone lines 290 originating from the PSTN 70. These lines carry incoming and outgoing telephone traffic.

The operator distributed call management modules 260 provide the network termination and call processing for the operator workstations 60. Operator workstations 60 can be used to receive and originate radio calls, telephone calls, and intercom calls.

Whereas the description thus far distinguishes radio distributed call management modules, telephone distributed call management modules and operator distributed call management modules, this is merely for purposes of explaining the system operation and does not form a limitation of the system. The distributed call management module shown in FIG. 9 performs all three functions.

Figure 9:
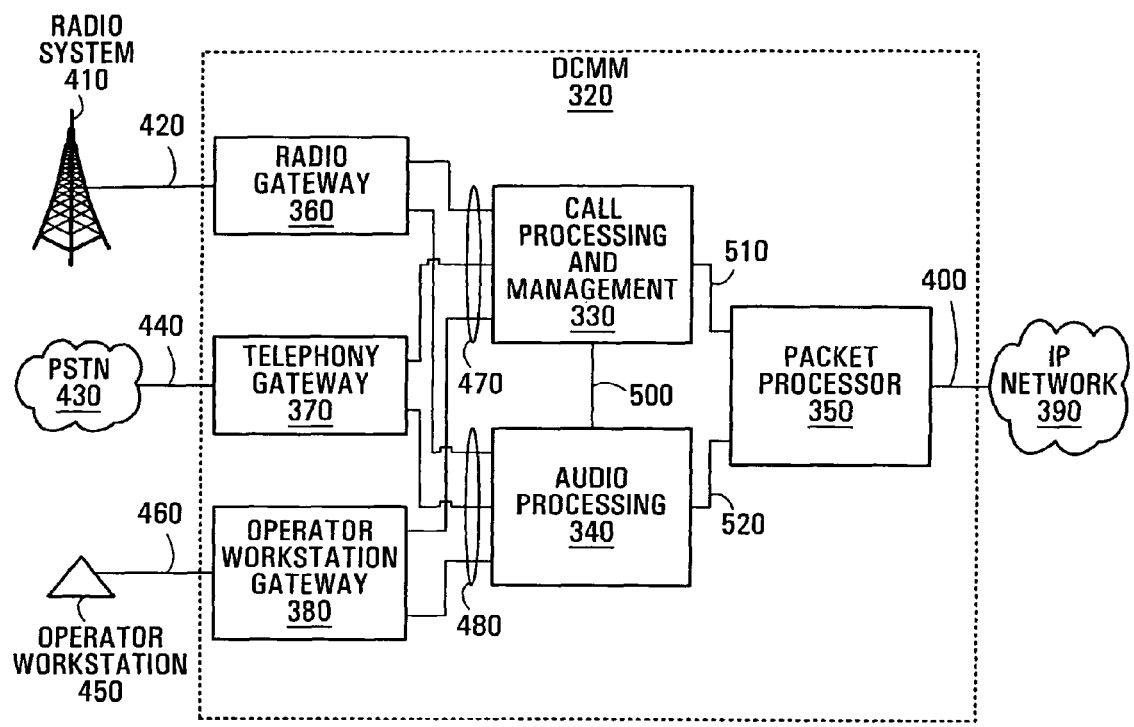
FIG. 9 is a block diagram of one exemplary distributed call management module in accordance with an embodiment of the present invention.

FIG. 9 depicts one exemplary distributed call management module 320 in accordance with the present invention. Distributed call management module 320 comprises a call processing and management engine 330, an audio processing engine 340, a packet processor 350 coupled to an IP network 390 over a LAN connection 400, a radio gateway 360 coupled to a radio system 410 over radio interfaces 420, a telephone gateway 370 coupled to the PSTN 430 over telephone lines 440, an operator workstation gateway 380 coupled to operator workstation 450 over the operator interface 460. In some embodiments LAN connection 400 is an Ethernet connection.

Referring to FIG. 9, signaling links 470 couple the gateways 360, 370, 380, and the call processing and management engine 330; audio links 480 couple the gateways 360, 370, 380, and the audio processing engine 340; control link 500 couples the call processing and management engine 330 with the audio processing engine 440; data links 510 and 520 couple the call processing and management engine 330, the audio management engine 340, and the packet processor 350.

The radio gateway 360 provides a plurality of radio interfaces 420 to radio systems 410. One of the roles of the radio gateway 360 is to implement the radio interface 420, which is dependent on the radio system 410. Thus, the gateway has the hardware and software to convert the signaling and audio into and from packet form. In turn, the radio gateway 360 can terminate and originate the signaling required to control the radio system 410, and can provide an interface to the call processing and management engine 330 for the control, over, for example, the interface 470. The radio gateway 360 can also convert the audio from the radio system 410 over the radio interface 420 to a form meaningful for exchange with the audio processing engine 340 over the link 480. The radio gateway 360 also does the reverse conversion of signals from the audio processing engine into audio in a form meaningful to the radio system 410. Details as the configuration of a radio gateway can be found in the Applicant's co-pending United States Application entitled "Radio Gateway System and Method for Interfacing a Radio System and an IP network" U.S. patent application Ser. No. 11/095,465, now issued U.S. Pat. No. 7,460,510.

The telephone gateway 370 provides a plurality of telephone interfaces 440 to PSTN 430. One of the roles of the telephone gateway 370 is to implement the telephone interface 440, which is dependent on the PSTN 430. In turn, the telephone gateway 370 can terminate and originate the signaling required to control the PSTN 430, and can provide an interface to the call processing and management engine 330 for the control, over the interface 470. The telephone gateway 370 can also convert the audio from the PSTN 430 over the telephone interface 440 to a form meaningful for exchange with the audio processing engine 340 over the link 480. The telephone gateway 370 also does the reverse conversion of signals from the audio processing engine into audio in a form meaningful to the PSTN 430.

The workstation gateway 380 provides a plurality of workstation interfaces 460 to workstation 450. One of the roles of the workstation gateway 380 is to implement the workstation interface 460, which is dependent on the workstation 450. In turn, the workstation gateway 380 can terminate and originate the signaling required to control the workstation 450, and can provide an interface to the call processing and management engine 330 for said control, over the interface 470. The workstation gateway 380 can also convert the audio from the workstation 450 over the workstation interface 460 to a form meaningful for exchange with the audio processing engine 340 over the link 480. The workstation gateway 380 also does the reverse conversion of signals from the audio processing engine into audio in a form meaningful to the workstation 460.

The call processing and management engine 330 performs similar functions to the call processing and management engine 710 described with reference to FIG. 2. The audio processing engine 340 performs functions similar to the audio processing engine 720 described with reference to FIG. 2. The packet processor 350 performs functions similar to the packet processor 730 described with reference to FIG. 2.

As will readily be recognized by those skilled in the art, multiple embodiments of the distributed call management module 320 are possible, where functions are implemented in software, hardware or a combination thereof. For instance, the radio gateway 360, telephone gateway 370, operator gateway 380, call processing and management engine 330, audio management engine 340 and packet processor 350 could all reside within a single unit, with the operator workstation 450 residing in a separate physical unit (e.g. personal computer). Alternatively, the operator gateway 380, call processing and management engine 330, audio management engine 340, packet processor 350 and operator workstation 450 could reside within a single physical unit (e.g. personal computer), with the radio gateway and telephone gateway being separate physical units. These are only some of the many examples of other embodiments.

Of course, the dispatch system is not limited to the embodiments shown in FIGS. 1 and 3. Other embodiments are possible, due to the nature of multicast-enabled IP networks.

Figure 10:
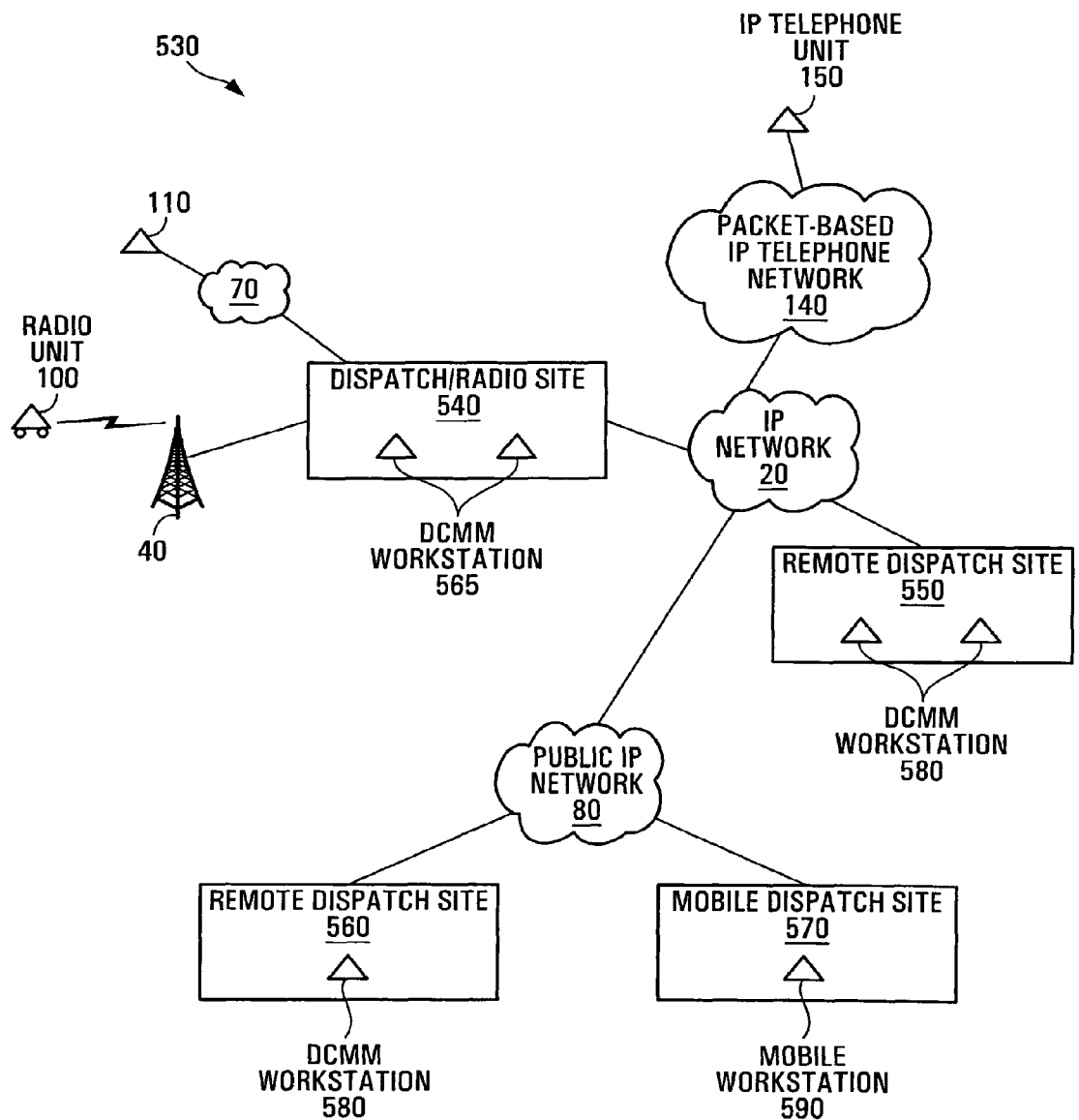
FIG. 10 is a block diagram of another exemplary dispatch system in accordance with an embodiment of the present invention.

For instance, FIG. 10 depicts another exemplary dispatch system 530 in accordance with the present invention. The FIG. 10 system preferably comprises an IP network 20, a combined dispatch/radio site 540 that includes workstations 565, a radio system 40, a radio unit 100, a PSTN 70, a telephone unit 110, a public IP network 80, a packet-based IP telephone network 140, an IP telephony unit 150, two remote dispatch sites 550 and 560 that include combined distributed call management module/workstations 580, and a mobile dispatch site 570 that includes a mobile workstation 590.

In some embodiments the IP network 20 is a WAN and the public IP network 80 is the Internet. In some embodiments the telephone units 110 are wireline units. In other embodiments they are wireless units. In still other embodiments they can include both wireless and wireline units.

In operation, calls can be originated by any of the audio devices in the system of FIG. 10. The calls are converted by distributed call management modules responsible for the audio devices according to a method described above and sent as IP packets to an IP multicast group address for the audio device that originated the call. The following are examples of how calls are routed in the embodiment illustrated in FIG. 10.

Radio Unit Call

A radio unit 100 can initiate a radio call, which can be a voice transmission, a data transmission or any combination thereof, in which case the call is routed via RF to radio system 40, then through radio system 40 to the combined dispatch/radio site 540. Communication between the radio system 40 and the radio site 540 can be over a physical circuit. As with the radio site 30 shown in FIG. 3, a distributed call management module at the combined dispatch/radio site 540 can convert the radio call to IP packets for processing by entities connected to the IP network 20, using a method such as described earlier. Any workstation 565, 580 or 590 that has subscribed to the IP multicast group of radio unit 100 is subsequently able to monitor the radio call.

Operator Call

Any workstation 565, 580 or 590 can initiate a radio call to a radio unit 100, which can be a voice transmission, a data transmission or any combination thereof, in which case the call is routed through the combined dispatch/radio site 540 to a radio system 40. The communication between the combined dispatch/radio site 540 and the radio system 40 can be over a physical circuit. The operator voice is then directed to the radio system 40 for broadcasting over the RF network and receiving by radio unit 100.

Telephone Unit Call

A telephone unit 110 can initiate a telephone call, which is routed through the PSTN 70 to the radio/dispatch site 540, using, for example, common physical circuits. The distributed call management module at radio/dispatch site 540 can convert the telephone call to IP packets for processing by entities connected to the IP network 20, and determines the proper workstation 565, 580 or 590 to which to present the call, based on preset call distribution rules. The workstation 565, 580 or 590 can then be used to answer the call. Similarly, an operator workstation 565, 580 or 590 can select a telephone line to place a call to a telephone unit 110 through PSTN 70.

IP Telephony Unit Call

A IP telephony unit 150 can initiate a telephone call, which is routed through the IP telephone network 140 to the radio/dispatch site 540, using virtual circuits. The distributed call management module at radio/dispatch site 540 determines the proper workstation 565, 580 or 590 to which to present the call, based on preset call distribution rules. The workstation 565, 580 or 590 can then be used to answer the call. Similarly, an operator workstation 565, 580 or 590 can select a telephone line to use to place a call to a IP telephone unit 150 through IP telephone network 140.

Figure 11:
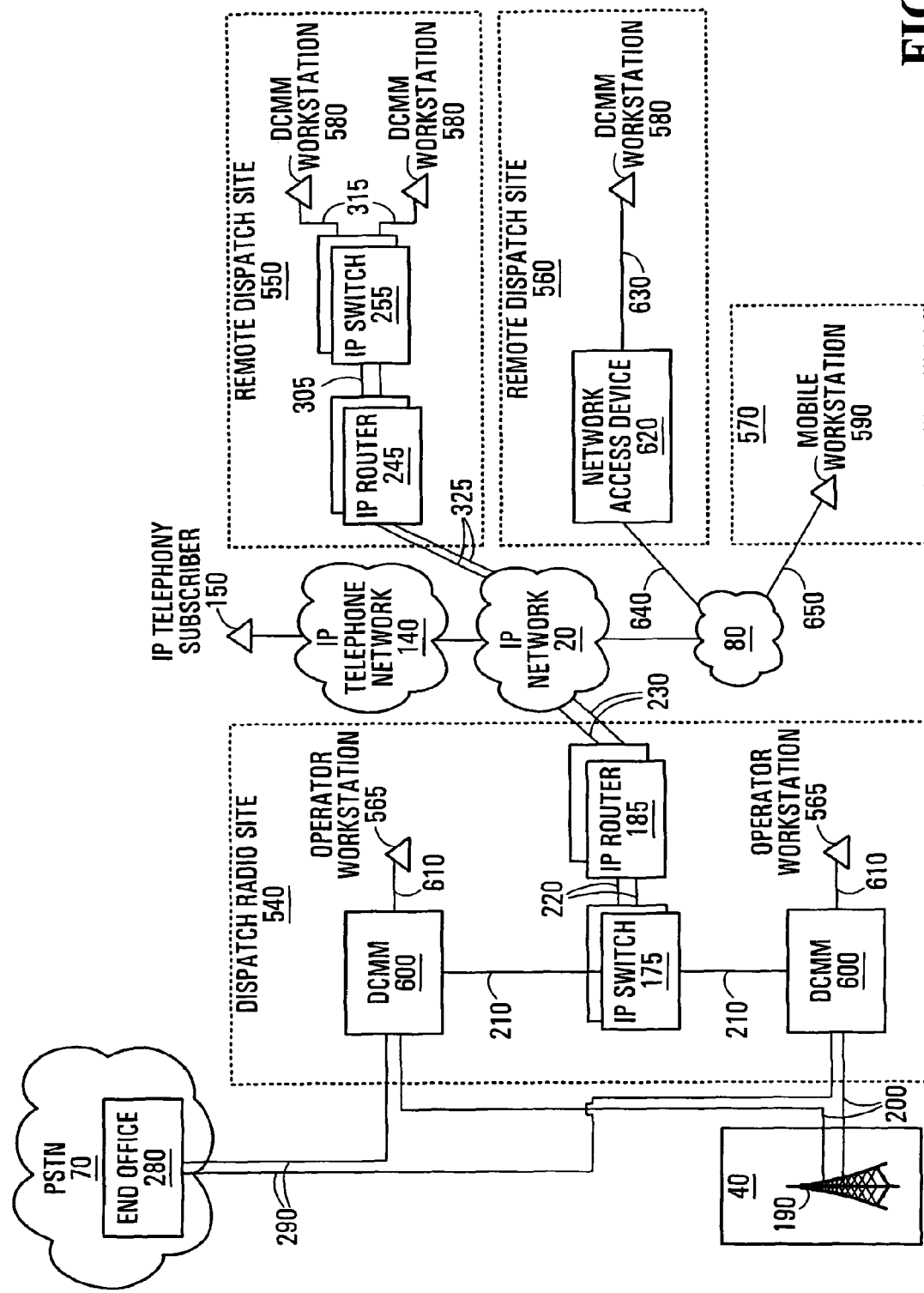
FIG. 11 is a block diagram of one example of an exemplary dispatch system structure.

FIG. 11 depicts one example of an embodiment of the dispatch system structure shown in FIG. 10. Referring to FIG. 11, the radio/dispatch site 540 includes redundant IP switches 175, redundant IP routers 185, combined operator/radio/telephone distributed call management modules 600, and workstations 565. The radio/dispatch site 540 couples the end offices 280 in the PSTN 70 via telephone lines 290, couples the radio base stations 190 in the radio system 40 via radio interfaces 200, and couples the IP telephone network 140 via the IP network 20. The IP switches 175 and IP routers 85 are coupled via redundant LAN connections 220. In some embodiments the LAN connections are Ethernet connections. The IP switches 175 and distributed call management modules 600 are coupled via LAN connections 210. The IP routers 185 are coupled to the IP network 20 via redundant WAN connections 230, which in some embodiments are ATM or Frame Relay links over copper or optical connections. The workstations 565 are coupled to the distributed call management modules 600 over links 610. In some embodiments these links are physical links. In other embodiments they are virtual links where workstations 565 are coupled to the IP switches 175 and the connection between the workstations 565 and the distributed call management modules 600 is through the IP switches 175.

Remote dispatch site 550 includes redundant IP routers 245, redundant IP switches 255, and workstations 580. In some embodiments, the workstations 580 comprise combined operator distributed call management modules and workstations as described earlier. The IP routers 245 and IP switches 255 are coupled via redundant LAN connections 305. The IP switches 255 and workstations 585 are coupled via LAN connections 315. The IP routers 245 are coupled to the IP network 20 via redundant WAN connections 325.

Remote dispatch site 560 includes network access device 620 and workstation 580. Examples of network devices 620 include DSL or cable modems. Network access device 620 and workstation 580 can be coupled via LAN connection 630. The network access device 620 can be coupled to the IP network 20 via WAN connection 640, using, for example, a virtual network tunneled via the public IP network 80. In some embodiments the WAN connection 640 is a DSL connection. In other embodiments it is a cable connection.

Remote dispatch site 570 includes mobile workstation 590, comprising an integrated network access device. In some embodiments the mobile workstation 590 is a laptop computer and the network access device is a dial-up modem. Mobile workstation 590 can comprise a combined operator distributed call management module and workstation as described earlier or it may be served by a distributed call management module 600 in radio/dispatch site 540. The mobile workstation 590 is coupled to the wide-area network 20 via WAN connection 640, using, for example, a virtual network tunneled via the public IP network 80.

In the FIG. 11 example, when a radio call arrives from the radio site 40 over a radio interface 200, it is processed by the combined operator/radio/telephone distributed call management module 600, where the signaling is interpreted and converted to status changes multicast to all distributed call management modules over the status multicast group, and where the audio is converted to RTP and sent over the designated IP multicast group for the particular radio channel.

In the FIG. 11 system, operator/radio/telephone distributed call management modules 600 can also originate radio calls over a radio interface 200, at the request of an operator within the system or for a non-operator-initiated transmission, which in some embodiments is a patch or radio repeat transmission. The signaling is originated by the radio distributed call management module 600 towards the radio interface 200, and the audio is taken from its RTP form on an IP multicast group and converted for transmission towards the radio interface 200. The distributed call management modules 600 also terminate telephone lines 290 originating from the PSTN 70. These lines can carry incoming and outgoing telephone traffic. The distributed call management modules 600 further provide the network termination and call processing for the operator workstations 565. Operator workstations 565 can be used to receive and originate radio calls, telephone calls, and intercom calls.

In the FIG. 11 example, the IP switches 175 serve a similar function to the IP switches 170 in FIG. 7. The IP switches 255 serve a similar function to the IP switches 250 in FIG. 8.

The routers 185 serve a similar function to the routers 180 shown in FIG. 7. To this end, they can perform translation from the LAN protocol, such as Ethernet to a WAN protocol, such as ATM or Frame Relay, as well as Network Address Translation (NAT) and firewall functions as appropriate. The routers 245 serve a similar function to the routers 240 shown in FIG. 8.

The combined workstation/distributed call management modules 580 can provide the network termination and call processing for the connected operator workstations, which can be used to receive and originate radio calls, telephone calls, and intercom calls.

The network access device 620 serves to bridge the distributed call management module/workstation 580 in remote dispatch site 560 to the network 20. To this end, it can perform translation from the workstation protocol, such as Ethernet to a WAN protocol, such as DSL or cable. For remote dispatch site 560, as well as for the remote PSAP 570 case, Network Address Translation (NAT) and firewall functions can be performed by the workstation 580 or 590.

The above embodiments have been presented to illustrate examples of the present inventions, and are not presented to limit the present invention to any particular embodiment or structure discussed.

What is claimed is:

1. A distributed dispatch control system configured to use a packet network in providing signaling connectivity to a plurality of devices, the system comprising:
    a plurality of distributed call management modules, each distributed call management module being adapted to serve a device of the plurality of devices and each distributed management call module having a respective group address for said device, each distributed management call module being at least partially implemented by hardware;
    each distributed call management module configured to convert signaling from the served device into packets for distribution through the packet network using the respective group address via one of the plurality of distributed management modules; and
    each distributed call management module configured to:
        receive packets addressed to the at least one selected group address and convert such packets for distribution to at least one device of the plurality of devices,
        wherein each distributed call management module is configured to perform arbitration functions for the at least one device that the distributed management module is serving by:
            receiving one or more acceptances of a transmission from one or more devices of the plurality of devices, at least one of the one or more devices comprising at least two operator workstations;
            selecting at least one of the operator workstations to handle the transmission from the one or more devices; and
            granting access to transmit data between the served device and the selected operator workstation.

2. The distributed dispatch control system according to claim 1 wherein at least some of the distributed call management modules serve multiple devices.

3. The distributed dispatch control system according to claim 1, wherein the at least one device comprises at least one telephony unit.

4. The distributed dispatch control system according to claim 3, wherein the at least one telephony unit is a PSTN (Public Switched Telephone Network) telephone unit.

5. The distributed dispatch control system according to claim 3, wherein the at least one telephony unit is an IP (Internet Protocol) based telephony unit.

6. The distributed dispatch control system according to claim 1, wherein the packet network is an IP (Internet Protocol) network.

7. The distributed dispatch control system according to claim 1, wherein signals from the served device include audio packets for delivery to a plurality of devices.

8. The distributed dispatch control system according to claim 1, wherein the selected operator workstation broadcasts to other channels, and the distributed call management module responsible for the selected operator workstation subscribes to the IP multicast groups of the other channels and sends the IP packets to all of the distributed call management modules responsible for the channels that the selected operator workstation chose.

9. The distributed dispatch control system according to claim 1, wherein each distributed call management module is further configured to perform arbitration functions for the device that the distributed management module is serving by:
   originating a transmission;
   receiving one or more acceptances from one or more devices of the plurality of devices;
   selecting one of the devices to handle the transmission.

10. The distributed dispatch control system according to claim 1, further comprising the plurality of devices.

11. The distributed dispatch control system according to claim 1, wherein the respective group addresses are IP multicast group addresses.

12. The distributed dispatch control system according to claim 1, wherein each distributed call management module comprises a software module operating on one of dedicated hardware or a computer.

13. The distributed dispatch control system according to claim 1, wherein each distributed call management module comprises:
   a processing engine for converting the signaling from the served device to a protocol understandable by the packet network and for converting signals from the packet network to signaling understandable by the served device, said processing engine being at least partially implemented by hardware;
   a signal management engine for directing the converted signaling to the respective group address, said signal management engine being at least partially implemented by hardware; and
   a packet processor for encoding the converted signaling as packets and for decoding packets received from the packet network, said packet processor configured to send and receive packets over the packet network, said packet processor being at least partially implemented by hardware.

14. The distributed dispatch control system according to claim 1, wherein the distributed call management module is configured to convert said received packets using at least one of MGCP (Media Gateway Control Protocol), MEGACO (Media Gateway Control) protocol, H.323 protocol, or SIP protocol.

15. The distributed dispatch control system according to claim 1, wherein the distributed call management module is configured to convert said signaling using any one of G.711, G.723.1, G.729, GSM, IMBE and TETRA protocols.

16. The distributed dispatch control system according to claim 1, wherein configuration of any device is possible without system interruption.

17. The distributed dispatch control system according to claim 1, wherein failure of one distributed call management module will affect only the operation of said failed distributed management module.

18. The distributed dispatch control system according to claim 1, wherein the plurality of devices comprises at least one radio unit and at least one operator workstation.

19. The distributed dispatch control system according to claim 18, wherein each distributed call management module serving an operator workstation is configured to monitor a plurality of group addresses each associated with a radio channel.

20. The distributed dispatch control system according to claim 18, wherein at least one radio unit is an Internet Protocol based radio unit.

21. The distributed dispatch control system according to claim 18, wherein the at least one operator workstation comprises at least one remote operator workstation is connected over a public network.

22. The distributed dispatch control system according to claim 18, wherein processing for a transmission originated by the at least one radio unit comprises:
   transmitting packets to the respective group address;
   monitoring, using at least one operator workstation, the respective group address responding to an acceptance of the transmission; and
   selecting one of the one or more operator workstations to handle the transmission.

23. A method of dispatching a transmission between devices connected to a packet network, the method comprising:
   obtaining, via a distributed call management module, a multicast group address for each device;
   receiving, via the distributed call management module, the transmission from a served device, the transmission including the multicast group address assigned to the served device;
   converting, via the distributed call management module, at least a portion of the transmission received from the served device to packets for distribution through the packet network based on the respective group address;
   communicating, via the distributed call management module, at least one of the received packets to devices assigned the multicast group address;
   receiving, via the distributed call management module, one or more acceptances of the packets from respective devices, at least one of the respective devices comprising an operator workstation;
   selecting, via the distributed call management module, one operator workstation that has provided an acceptance to handle the transmission; and
   granting, via the distributed call management module, access to transmit data between the served device and the selected operator workstation.

24. The method according to claim 23, further comprising converting the packets into a format understandable by a second audio device.

25. The method of claim 23, wherein the assigning comprises assigning a unique IP multicast group address to each device.

26. The method of claim 23, further comprising assigning a status IP multicast group address for transmission of status information.

27. The method of claim 23, wherein assigning the multicast group address comprises statically defining the multicast group address.

28. The method of claim 23, wherein assigning the multicast group address comprises assigning a separate multicast group address to each device.

29. The method according to claim 23, further comprising:
   subscribing a second device to the multicast group of the served device;
   converting a transmission from the second audio device to second packets; and
   transmitting the second packets to the multicast group address of the second audio device.

* * * * *